United States Patent
Weilant

(10) Patent No.: US 6,935,475 B2
(45) Date of Patent: Aug. 30, 2005

(54) ELECTROMAGNETIC CLUTCH HAVING BALL RAMP ACTUATOR AND TORSION SPRING

(75) Inventor: David R. Weilant, Muncie, IN (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/401,807

(22) Filed: Mar. 28, 2003

(65) Prior Publication Data

US 2004/0188212 A1 Sep. 30, 2004

(51) Int. Cl.[7] .............................................. F16D 27/112
(52) U.S. Cl. ........................ 192/35; 192/84.7; 180/247
(58) Field of Search ................... 192/35, 84.7; 180/247; 74/665 GE

(56) References Cited

U.S. PATENT DOCUMENTS

| 4,989,686 A | | 2/1991 | Miller et al. |
| 5,083,986 A | | 1/1992 | Teraoka et al. |
| 5,407,024 A | | 4/1995 | Watson et al. |
| 5,505,285 A | * | 4/1996 | Organek ........................ 192/35 |
| 5,584,776 A | * | 12/1996 | Weilant et al. ............... 475/213 |
| 5,810,141 A | * | 9/1998 | Organek et al. .............. 192/35 |
| 5,884,738 A | | 3/1999 | Joslin et al. |
| 5,890,573 A | * | 4/1999 | Kwoka ......................... 192/35 |
| 5,915,513 A | * | 6/1999 | Isley et al. .................... 192/35 |
| 6,033,334 A | | 3/2000 | Showalter |
| 6,062,361 A | | 5/2000 | Showalter |

* cited by examiner

*Primary Examiner*—Saul Rodriguez
(74) *Attorney, Agent, or Firm*—Brinks Hofer Gilson & Lione; Greg Dziegielewski

(57) ABSTRACT

An electromagnetic clutch for motor vehicle drive line applications includes a friction clutch pack, a ball ramp actuator and an electromagnetic coil. The ball ramp actuator includes a pair of circular members having opposed pairs of arcuate recesses receiving load transferring members and a torsion spring which provides a restoring force to return the circular members to their center, disengaged positions. Improved clutch control, particularly during disengagment, is achieved by this ball ramp actuator configuration.

20 Claims, 5 Drawing Sheets

ELECTROMAGNETIC CLUTCH HAVING BALL RAMP ACTUATOR AND TORSION SPRING

BACKGROUND

The invention relates generally to electromagnetic clutches for use in motor vehicle drive line components such as transfer cases, transmissions and the like and more particularly to an electromagnetic clutch having a ball ramp actuator and a torsion spring operably disposed between components of the ball ramp actuator.

Electromagnetic clutches utilizing ball ramp actuators are especially suited for use in motor vehicle driveline components. A typical ball ramp actuator electromagnetic clutch utilizes a pair of opposed circular plates defining opposed pairs of symmetrically ramped recesses. Adjacent the circular plates is a friction clutch pack having an input driven by the primary transfer case output shaft and a secondary output to the secondary driveline which is driven by the output of the friction clutch pack assembly. Retardation of motion of one of the circular plates causes axial separation thereof and such axial separation compresses the friction clutch pack and transfers torque from the input to the output.

One of the foremost advantages of a ball ramp actuated electromagnetic clutch assembly is its relatively low power consumption. Since the electromagnetic coil must only retard one of the circular plates to commence engagement of the clutch, the clutch coil and its current draw may be significantly smaller than a clutch wherein the electrical energy is utilized as the sole and direct energy source which engages the clutch.

While such clutch engagement can generally be accurately controlled by the controlled application of electrical energy to the electromagnetic coil, occasionally the deactivation of the clutch may be subject to mechanical and magnetic hysteresis. That is, clutch disengagement may not accurately track or correspond to decreasing clutch current. This may be the result of a failure by the clutch plates to modulatably disengage or may be the result of residual magnetism in the clutch components or other operating anomalies, which cause non-linear or non-proportional disengagement.

The present invention is directed to improvements in the art of ball ramp clutch actuators for electromagnetic clutches which improve the proportional response of such clutches, particularly during deactivation.

SUMMARY

An electromagnetic clutch for motor vehicle drive line applications includes a friction clutch pack, a ball ramp actuator and an electromagnetic coil. The ball ramp actuator includes a pair of circular members having opposed pairs of arcuate recesses receiving load transferring members and a torsion spring which provides a restoring force to return the circular members to their center, disengaged positions. Improved clutch control, particularly during disengagment, is achieved by this ball ramp actuator configuration.

Thus it is an object to the present invention to provide an electromagnetic clutch having a ball ramp actuator providing improved modulating control.

It is a further object to the present invention to provide an electromagnetic clutch having a ball ramp actuator including opposed circular members which are connected by torsion spring.

It is a still further object to the present invention to provide an electromagnetic clutch having a ball ramp actuator including circular members with opposed recesses and which are biased to their center positions by a torsion spring.

Further objects and advantages to the present invention will become apparent by reference to the following description of the preferred embodiment and appended drawings wherein like referenced numbers referred to the same component, element or feature.

DETAILED DESCRIPTION OF THE PREFERRED EMBODIMENT

Figure 1:
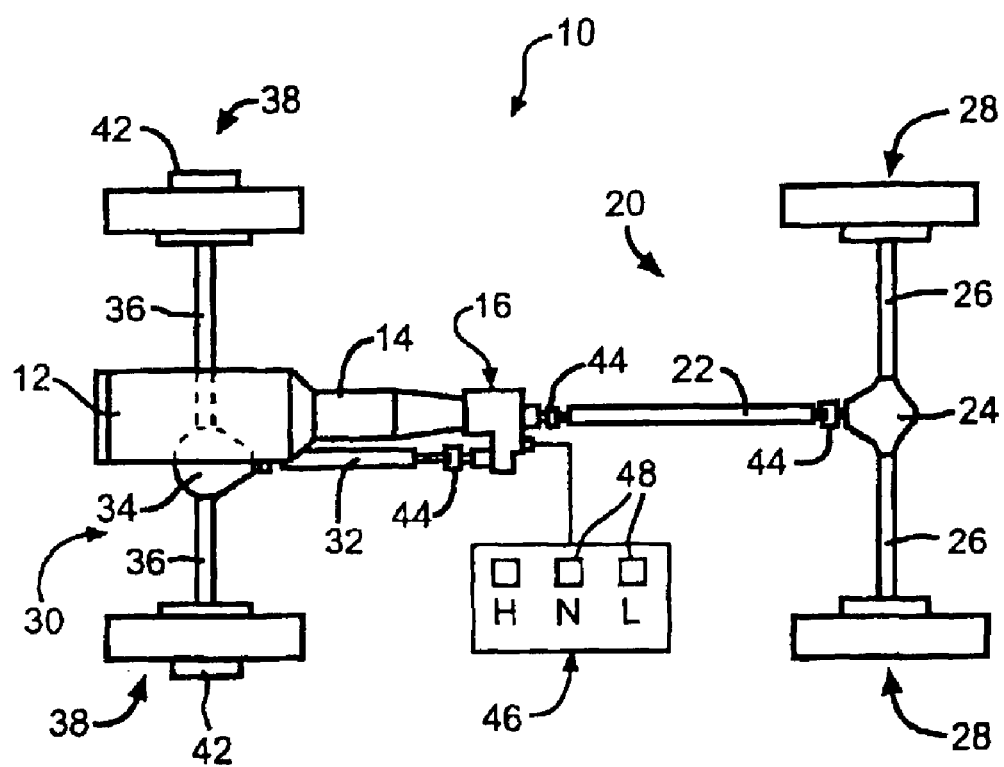
FIG. 1 is a diagrammatic, plan view of a four-wheel drive motor vehicle having a transfer case incorporating an electromagnetic clutch assembly according to the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components. A control console 46 which is preferably disposed within convenient reach of the vehicle operator includes a switch or a plurality of individual switches or push buttons 48 which facilitate selection of the operating mode of the transfer case assembly 16 as will be further described below.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
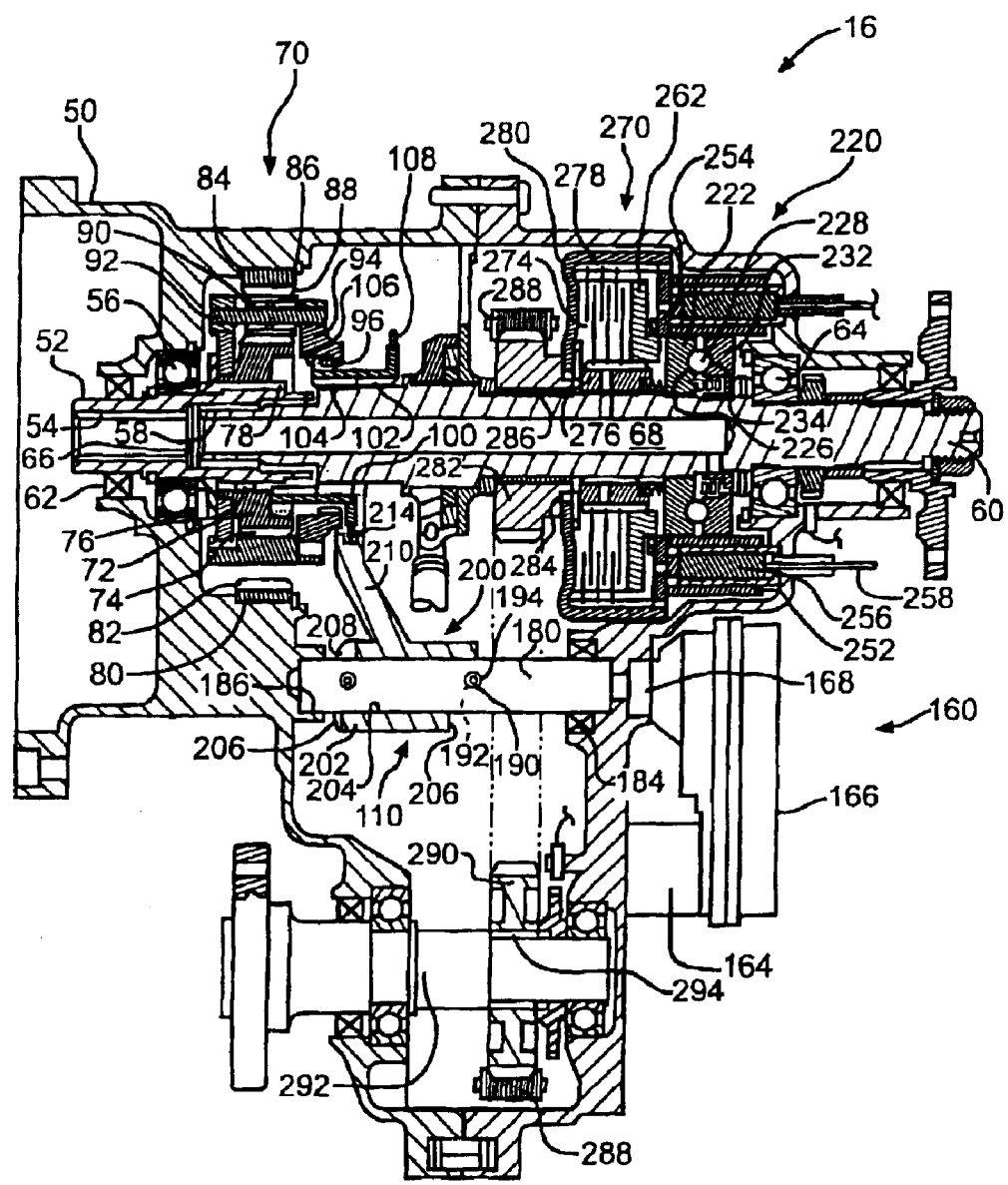
FIG. 2 is a side, elevational view in partial section of a transfer case incorporating an electromagnetic clutch assembly according to the present invention.

Referring now to FIGS. 1 and 2, the transfer case assembly 16 incorporating the present invention includes a multiple piece, typically cast, metal housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 illustrated in FIG. 1 to the input shaft 52. The input shaft 52 is rotatably supported externally by an anti-friction bearing such as the ball bearing assembly 56 and internally by an anti-friction bearing such as the roller bearing assembly 58. The roller bearing assembly 58 is disposed upon a reduced diameter portion of an output shaft 60. An oil seal 62, positioned between the input shaft 52 and the housing assembly 50, provides an appropriate fluid tight seal therebetween. The opposite end of the output shaft 60 is supported by an anti-friction bearing such as a ball bearing assembly 64. An end cap or seal 66 closes off the end of an axial passageway 68 in the output shaft 60. A gerotor pump P will typically be utilized to provide a flow of lubricating and cooling fluid to the axial passageway 68 which is thence distributed through a plurality of radial ports in the output shaft 60 to the components of the transfer case assembly 16.

The transfer case assembly 16 also includes a two-speed planetary (epicyclic) gear assembly 70 disposed generally about the input shaft 52. The planetary gear assembly 70 includes a sun gear collar 72 having a plurality of external gear teeth 74 and a plurality of internal splines or gear teeth 76. The internal splines or gear teeth 76 are engaged by complementary external splines or gear teeth 78 formed on the input shaft 52. Radially aligned with the sun gear 72 and its teeth 74 is a ring gear 80 having internal gear teeth 82. The ring gear 80 is fixedly retained within the housing assembly 50 by any suitable retaining structure such as a projection or lip 84 formed in the housing assembly 50 and a cooperating snap ring 86. A plurality of pinion gears 88 are rotatably received upon a like plurality of anti-friction bearings such as roller bearings 90 which, in turn, are supported and located by a like plurality of stub shafts 92. The plurality of stub shafts 92 are mounted within and secured to a planet carrier 94. The planet carrier 94 includes a plurality of internal or female splines or gear teeth 96. The planetary gear assembly 70 is more fully described in co-owned U.S. Pat. No. 4,440,042 which is herein incorporated by reference.

The planetary gear assembly 70 also includes a dog clutch or clutch collar 100 defining elongate internal splines or gear teeth 102. The internal splines or gear teeth 102 of the clutch collar 100 are slidably received upon a complementary plurality of external splines or gear teeth 104 on the output shaft 60. The clutch collar 100 thus rotates with the output shaft 60 but may translate bi-directionally therealong. The clutch collar 100 also includes external splines or gear teeth 106 on one end which are in all respects complementary to the internal splines or gear teeth 96 on the planet carrier 94. The end of the clutch collar 100 opposite the gear teeth 96 defines a circumferentially and radially extending flange 108.

The clutch collar 100 is capable of three positions and operational modes. In the lower portion of FIG. 2, the clutch collar 100 is illustrated in its leftmost or direct drive position. Direct drive is achieved when the internal splines or gear teeth 102 of the clutch collar 100 engage the external splines or gear teeth 78 on the input shaft 52 thereby directly coupling the input shaft 52 to the output shaft 60 and providing direct or high gear drive therebetween.

When the clutch collar 100 is moved to the right from the position illustrated in the lower portion of FIG. 2, to the position illustrated in the upper portion of FIG. 2, the speed reduction achieved by the planetary gear assembly 70 is engaged through engagement of the external splines or gear teeth 106 on the clutch collar 100 with the internal splines or gear teeth 96 on the planet carrier 94. So engaged, the planetary gear assembly 70 is active and provides a speed reduction, typically in the range of from 3:1 to 4:1 between the input shaft 52 and the output shaft 60. Between these two positions is a neutral position. In the center, neutral position both the input shaft 52 and the planet carrier 94 are disconnected from the output shaft 60 and no power is transmitted therebetween.

Referring to FIG. 2, the position of the clutch collar 100 is commanded by an electric shift control assembly 160. The shift control assembly 160 includes an electric drive motor 164 which drives a gear train (not illustrated) disposed in a housing 166. The housing supports an output shaft 168. The output shaft 168 is coupled by interengaging splines (not illustrated) to a rotatable shift rail 180. An oil seal 184 provides a suitable fluid-tight seal between the shift rail 180 and the housing assembly 50.

The rotatable shift rail 180 extends across the housing assembly 50 and its opposite end is seated within a suitable counterbore 186 formed in the housing assembly 50. A pair of spaced-apart radially disposed stanchions or stub shafts 190 are securely seated within radial passageways 192 in the shift rail 180. The stub shafts 190 include enlarged heads which retain freely rotatable cam followers or rollers 194 thereon. Disposed between the spaced-apart stanchions or stub shafts 190 and the rollers 194 is a shift fork assembly 200. The shift fork assembly 200 includes a body 202 having a through passageway 204 which is sized to just freely rotatably receive the shift rail 180. At each end of the shift fork body 202 is a helical cam 206. The helical cams 206 are correspondingly disposed such that the axial distance from corresponding points on their surfaces is just slightly less than the distance between the inside surfaces of the rollers 194. An axially extending face or shoulder 208 which represents a discontinuity in the helical cams 206 acts as a positive stop in one direction of rotation as it engages one of the rollers 196.

The shift fork assembly 200 also includes an obliquely extending web 210 which terminates in a discontinuous, semi-circular channel or groove 214. The semi-circular channel or groove 214 receives and engages the flange 108 of the clutch collar 100. Such engagement inhibits rotation of the shift fork assembly 200. Accordingly, as the shift rail 180 and the cam followers or rollers 194 rotate, the shift fork assembly 200 and specifically the clutch collar 100 translate axially and bi-directionally. Such translation effects selective engagement of the clutch collar 100 and selection of high gear, neutral or low gear as previously explained.

Referring now to FIGS. 2, 3, 4 and 5 the transfer case assembly 16 also includes an electromagnetically actuated disc pack type clutch assembly 220. The clutch assembly 220 is disposed about the output shaft 60 and includes a circular drive member 222 coupled to the output shaft 60 through, for example, a splined interconnection. The circular drive member 222 includes a plurality of circumferentially spaced-apart recesses 226 in the shape of an oblique section of a helical torus. Each of the recesses 226 receives one of a like plurality of load transferring balls 228. The circular drive member also includes a radially offset, axially extending first rectangular slot 230.

A circular driven member 232 is disposed adjacent the circular drive member 222 and includes a like plurality of opposed recesses 234 defining the same shape as the recesses 226. The oblique side walls of the recesses 226 and 234 function as ramps or cams and cooperate with the balls 228 to drive the circular members 222 and 232 apart in response to relative rotation therebetween. It will be appreciated that the recesses 226 and 234 and the load transferring balls 228 may be replaced with other analogous mechanical elements which cause axial displacement of the circular members 222 and 232 in response to relative rotation therebetween. For example, tapered rollers disposed in complementarily configured conical helices may be utilized.

The circular driven member 232 includes a counterbore or reentrant region 236 which receives a coiled torsion spring 238. The configuration of the torsion spring 238 is preferably of rectangular cross-section and it defines a plurality of turns or coils terminating in a pair of axially extending lugs or tangs 242. One of the tangs 242 is received within a first rectangular slot 230 formed in the circular drive member 222 and the other tang 242 is received within a second rectangular slot 244 formed in the circular driven member 234.

The circular driven member 232 extends radially outwardly and is secured to a soft iron rotor 252. An armature 254 is disposed adjacent the face of the rotor 252. The rotor 252 surrounds an electromagnetic coil 256 on three sides.

The electromagnetic coil 256 is provided with electrical energy preferably from a pulse width modulation (PWM) control through an electrical conductor 258. The pulse width modulation scheme increases or decreases the average current to the electromagnetic coil 256 of the electromagnetically actuated disc pack type clutch assembly 220, as will be more fully described below, by increasing or decreasing the on time (duty cycle) of a drive signal. It will be appreciated that other modulating control techniques may be utilized to achieve engagement and disengagement of the electromagnetic disc pack type clutch assembly 220.

Providing electrical energy to the electromagnetic coil 256 causes magnetic attraction of the armature 254 with the rotor 252. This magnetic attraction results in frictional contact of the armature 254 to the rotor 252. When the output shaft 60 is turning at a different speed than the armature 254 this frictional contact results in a frictional torque being transferred from the output shaft 60, through the circular drive member 222, through the load transferring balls 228 and to the circular driven member 232. The resulting frictional torque causes the balls 228 to ride up the ramps of the recesses 226 and 234, causing axial displacement of the circular drive member 222. Axial displacement of the circular drive member 222 translates an apply plate 262 axially toward a disc pack clutch assembly 270. A compression spring 272 which may comprise a stack of Belleville washers provides a restoring force which biases the circular drive member 222 toward the circular driven member 232.

An important design consideration of the recesses 226 and 234 and the balls 228 is that the geometry of their design and the design of the compression spring 272 and the clearances in the disc pack assembly 270 ensure that the electromagnetic clutch assembly 220 is not self-locking. The electromagnetic clutch assembly 220 must not self-engage but rather must be capable of controlled, proportional engagement and torque transfer in direct response to the modulating control input.

The torsion spring 238 provides a defined, repeatable restoring torque to the first and second circular members 222 and 234 which improves operation, especially when the current to the electromagnetic coil 256 is being reduced, compression of the disc pack clutch assembly 270 is being relaxed and torque transferred through the disc pack clutch assembly is diminishing. The restoring torque provided by the torsion spring 238 dampens the apply response of the disc pack clutch assembly 220 and reduces hysteresis during release thereof. The spring rate of the torsion spring 238 will be determined both experimentally and empirically to provide optimum operation and smooth and controlled, i. e., corresponding to the modulating current supplied to the electromagnetic coil 256, clutch engagement and disengagement.

Figure 3:
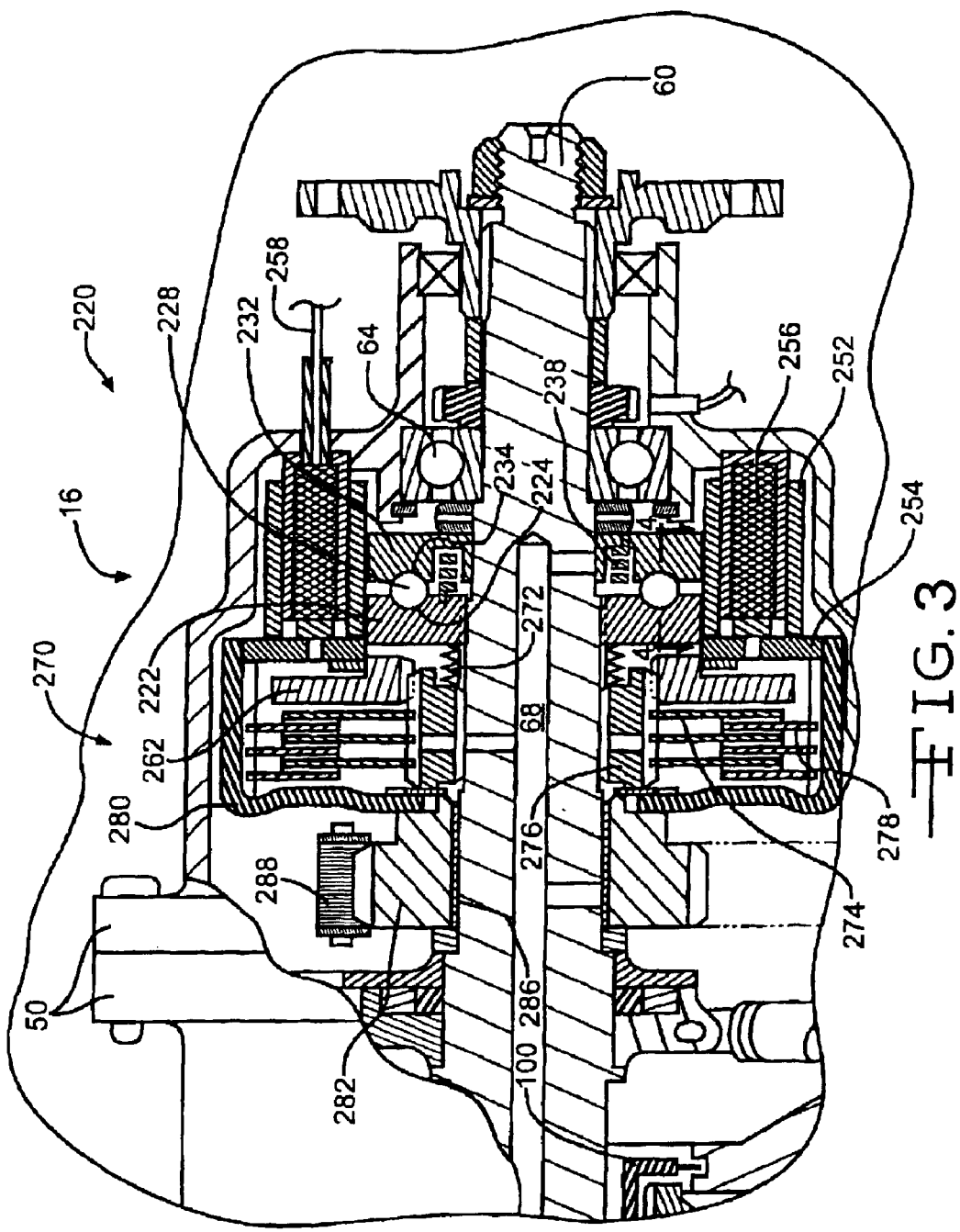
FIG. 3 is an enlarged, fragmentary sectional view of a transfer case incorporating an electromagnetic clutch assembly according to the present invention.
Figure 4:
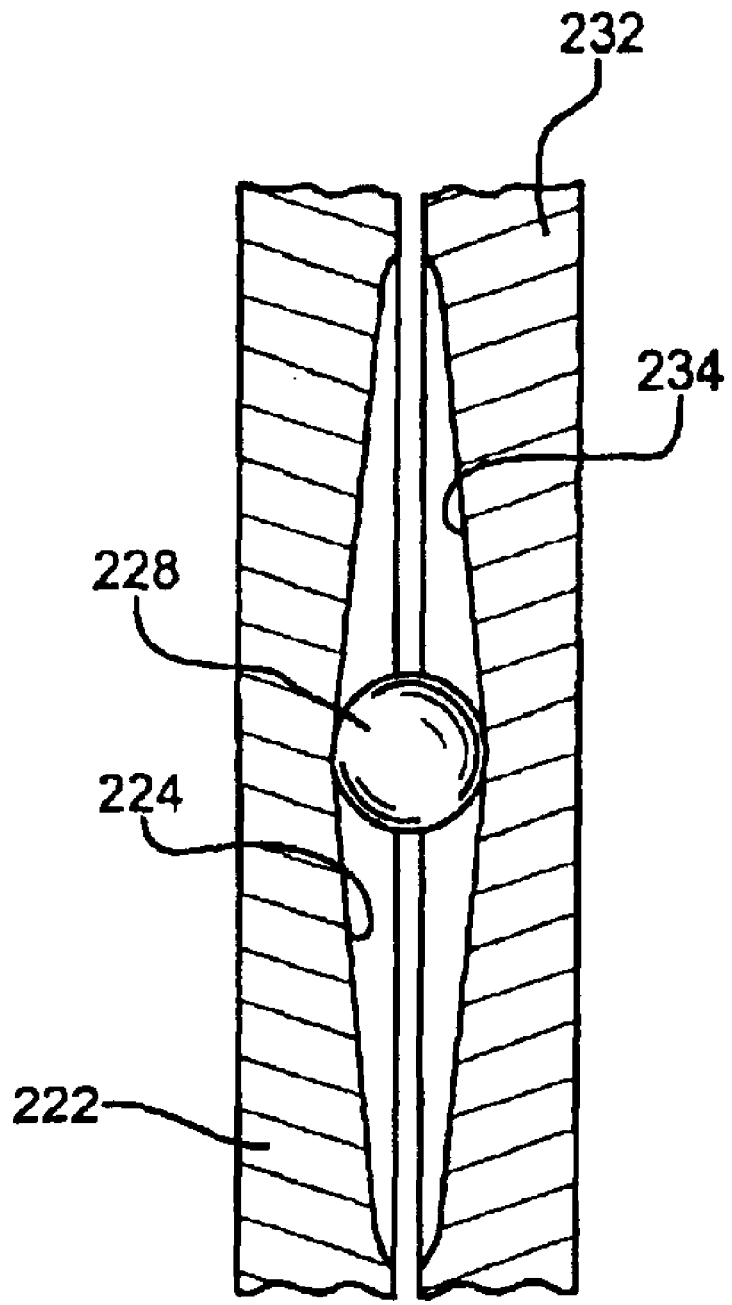
FIG. 4 is a flat pattern development of a section of one clutch ball and associated recesses incorporated in an electromagnetic clutch assembly according to the present invention, taken along line 4—4 of FIG. 3.
Figure 5:
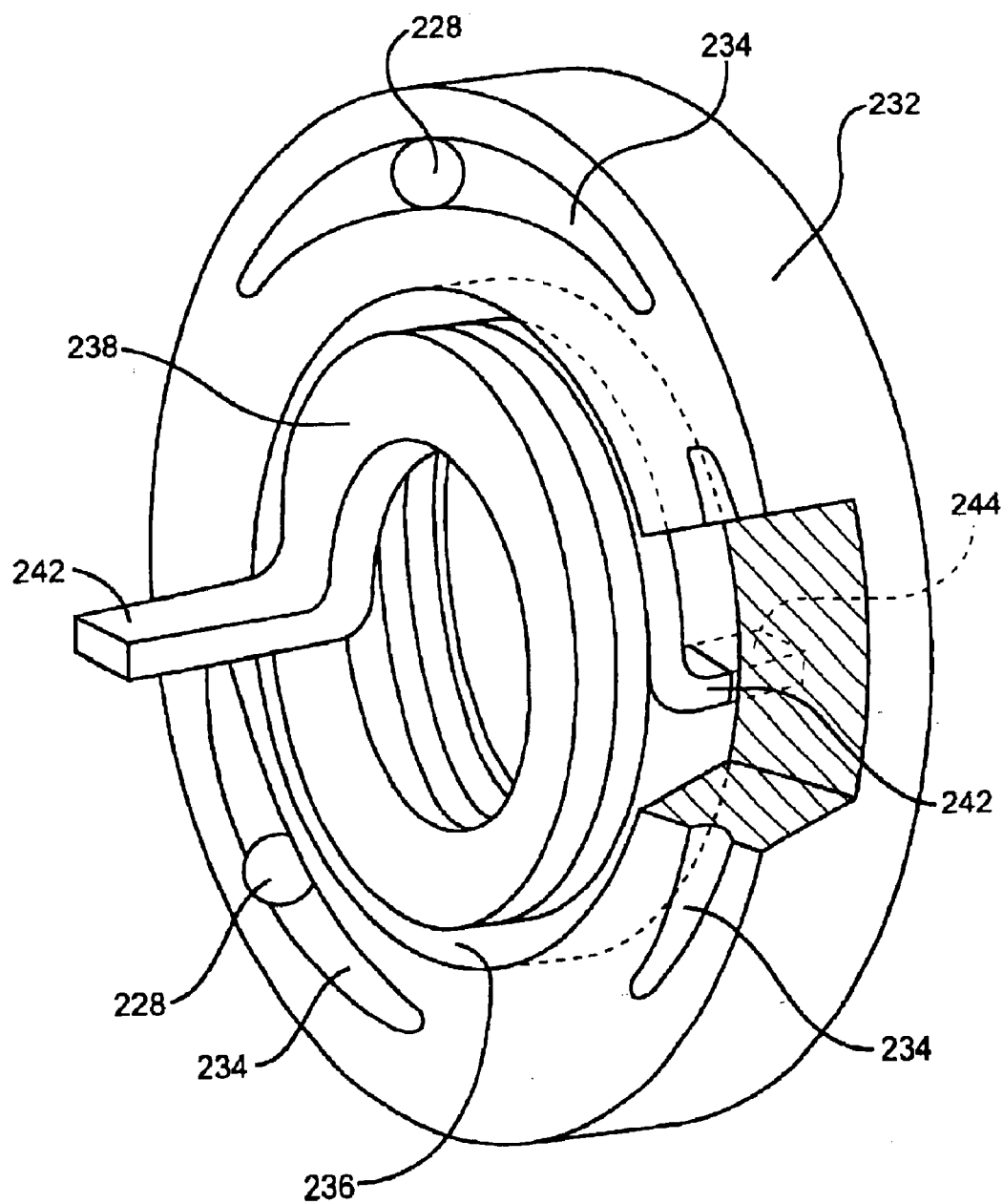
FIG. 5 is an enlarged, perspective view with a portion broken away of components of an electromagnetic clutch assembly according to the present invention.

Referring now to FIGS. 2 and 3, the disc pack clutch assembly 270 includes a first plurality of smaller friction plates or discs 274. The first plurality of discs 274 are coupled by interengaging splines to a clutch hub 276 which is coupled to the output shaft 60 for rotation therewith. A second plurality of larger friction plates or discs 278 are coupled to an annular housing 280 by interengaging splines for rotation therewith and are interleaved with the first plurality of friction discs 274.

The annular housing 280 is disposed concentrically about the output shaft 60 and is coupled to a chain drive sprocket 282 by a plurality of interengaging splines or lugs and recesses 284. The chain drive sprocket 282 is freely rotatably disposed on the output shaft 60 and is supported by a journal or needle bearing assembly 286. When the clutch assembly 220 is engaged, it transfers energy from the output shaft 60 to the chain drive sprocket 282. A drive chain 288 is received upon the chain drive sprocket 282 and engages and transfers rotational energy to a driven chain sprocket 290. The driven chain sprocket 290 is coupled to a front (secondary) output shaft 292 of the transfer case assembly 16 by interengaging splines 294.

The foregoing disclosure is the best mode devised by the inventors for practicing this invention. It is apparent, however, that apparatus incorporating modifications and variations will be obvious to one skilled in the art of shift control mechanisms. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A ball ramp clutch for a motor vehicle driveline comprising, in combination, an input member, an output member, a first circular member disposed for rotation with said input member and defining a first plurality of arcuate recesses and a first spring engaging feature, a rotor, a second circular member secured to said rotor, disposed adjacent said first circular member and defining a second plurality of arcuate recesses and a second spring engaging feature, a plurality of load transferring members disposed in said recesses, a torsion spring operably disposed between said first and said second spring engaging features of said circular members and, a friction clutch pack assembly having a first plurality of friction discs secured for rotation with said input member and a second interleaved plurality of friction discs secured for rotation with said output member, whereby relative rotation between said first circular member and said second circular member provides compressive force to said friction clutch pack.

2. The ball ramp clutch of claim 1 wherein said torsion spring is rectangular in cross section and includes a pair of axially extending tangs.

3. The ball ramp clutch of claim 2 wherein said spring engaging features of said circular members define slots for eceiving said tangs of said torsion spring.

4. The ball ramp clutch of claim 1 wherein said torsion spring includes a plurality of coils.

5. The bail ramp clutch of claim 1 further including an electromagnetic coil for retarding rotation of said rotor.

6. The ball ramp clutch of claim 5 wherein said rotor partially surrounds said electromagnetic coil.

7. The ball ramp clutch of claim 1 wherein said input member is a primary output shaft of a transfer case and said output member drives a secondary output of said transfer case.

8. An ball ramp clutch having a ball ramp operator comprising, in combination, an input member, an output member, a first member disposed for rotation with said input member and defining a plurality of ramped recesses and a first spring engaging feature, a second member disposed adjacent said first member, said second member defining a second plurality of ramped recesses adjacent said first plurality of ramped recesses and a second spring engaging feature.

a torsion spring engaging said spring engaging features of said first and second members, a plurality of load transferring members cooperatively disposed in opposed pairs of said ramped recesses, means for retarding motion of said second circular member relative to said first circular member, and a friction clutch pack operably disposed between said input and said output member and one of said circular members, wherein relative rotation between said first and second members compresses said friction clutch pack and transfers torque from said input member to said output member.

9. The ball ramp clutch of claim 8 wherein said means for retarding motion is an electromagnetic coil.

10. The ball ramp clutch of claim 9 further including a rotor partially surrounding said electromagnetic coil.

11. The ball ramp clutch of claim 8 wherein said torsion spring is rectangular in cross section and includes a pair of axially extending tangs.

12. The ball ramp clutch of claim 11 wherein said spring engaging features of said first and second members define slots which receive said tangs of said torsion spring.

13. The ball ramp clutch of claim 8 wherein said torsion spring includes a plurality of coils.

14. The ball ramp clutch of claim 8 further including an armature disposed adjacent said rotor.

15. A motor vehicle transfer case comprising, in combination, a shaft adapted to provide drive energy to a primary driveline, a secondary output for providing a drive energy to a secondary driveline, and an electromagnetic clutch assembly having a first circular member defining a plurality of ramped race sees disposed for rotation with said primary output and a first spring engaging feature, a second circular member defining ramped recesses freely rotatable about said primary output shaft and a second spring engaging feature, a torsions spring operably disposed between said spring engaging features of said first and said second circular members a plurality of load transferring members disposed in said ramped recesses, an electromagnetic coil for retarding motion of said second circular member, and a friction clutch pack having an input coupled to said shaft and an output driving said secondary output.

16. The transfer case assembly of claim 15 whereby energization of said electromagnetic coil compresses said friction clutch pack and transfers drive energy from said shaft to said secondary output.

17. The transfer case assembly of claim 15 wherein said torsion spring is rectangular in cross section and includes a pair of axially extending tangs.

18. The transfer case assembly of claim 17 wherein said spring engaging features of said circular members include slots which receive said tangs of said torsion spring.

19. The transfer case assembly of claim 15 wherein said torsion spring includes a plurality of coils.

20. The transfer case assembly of claim 15 further including a planetary gear speed reduction assembly adapted to drive said shaft.

* * * * *

UNITED STATES PATENT AND TRADEMARK OFFICE
CERTIFICATE OF CORRECTION

PATENT NO. : 6,935,475 B2
DATED : August 30, 2005
INVENTOR(S) : David R. Weilant It is certified that error appears in the above-identified patent and that said Letters Patent is hereby corrected as shown below:

Column 7,
Line 30, before "said tangs" delete "eceiving" and substitute -- receiving --.
Line 41, before "ball ramp clutch" delete "An" and substitute -- A --.
Line 51, after "second spring engaging feature" delete "." and substitute -- , --.

Column 8,
Line 29, before "disposed for rotation" delete "race sees" and substitute -- recesses --.

Signed and Sealed this

Thirtieth Day of May, 2006

JON W. DUDAS
*Director of the United States Patent and Trademark Office*